July 31, 1951     D. A. HARRISON     2,562,713
BARBECUE OVEN HAVING ROTATABLE BASKET
Filed Sept. 27, 1950
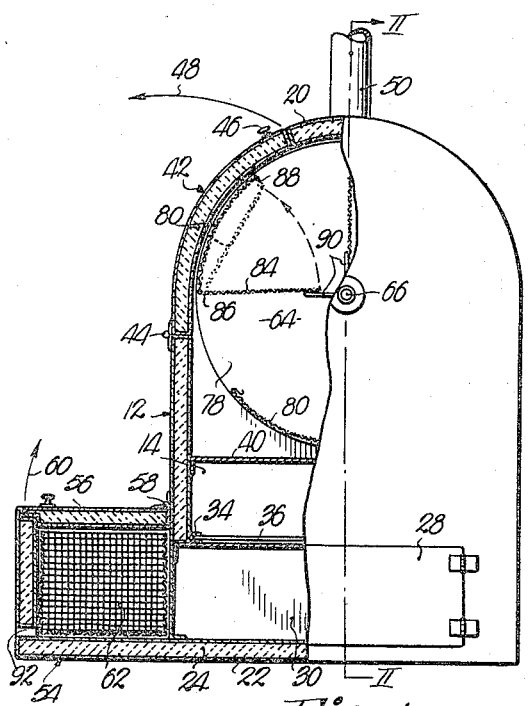
Fig. 1.
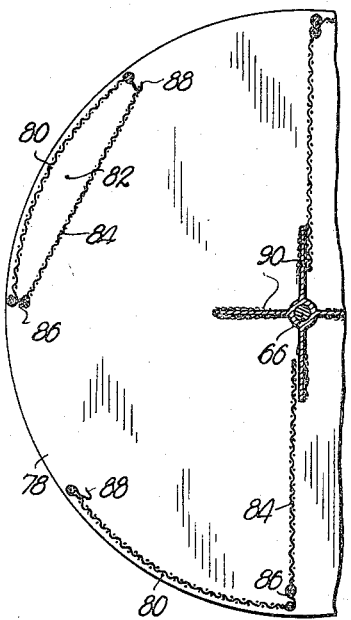
Fig. 3.
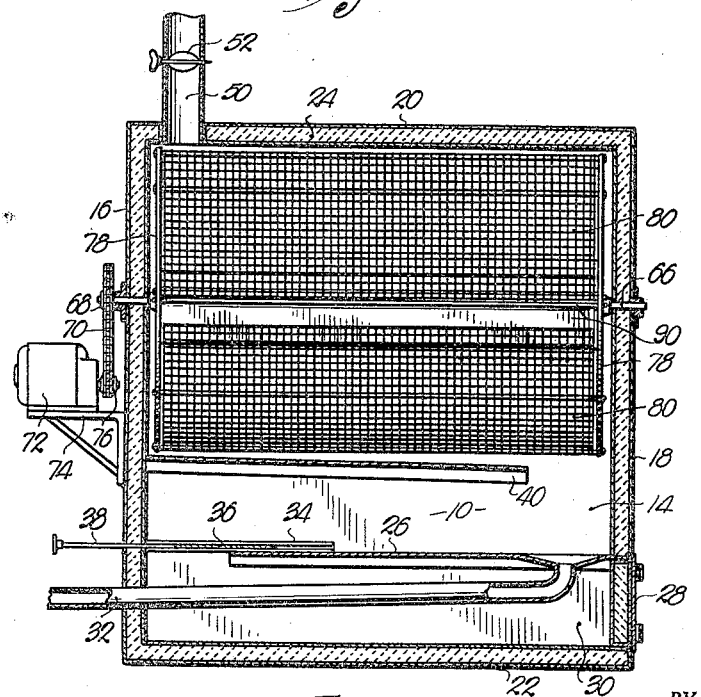
Fig. 2.
INVENTOR.
Dixon A. Harrison
ATTORNEY.

Patented July 31, 1951

2,562,713

UNITED STATES PATENT OFFICE 2,562,713

BARBECUE OVEN HAVING ROTATABLE BASKET

Dixon A. Harrison, Joplin, Mo.

Application September 27, 1950, Serial No. 187,034

5 Claims. (Cl. 99—397)

This invention relates to the preparation of foods and more particularly to apparatus adapted for barbecuing meats and the like, the primary object being to provide a continuously rotating foraminous drum or reel mounted within an oven and so formed as to have a tremendously large capacity relative to its over-all size.

Another very important object of this invention is the provision of barbecue apparatus having a rotatable foraminous drum that is substantially cylindrical and provided with a plurality of internal baskets, each having a lid movable to and from a closed position and adapted to hold the meat or other food in place during rotation of the drum.

A further object of this invention is the provision of a rotatable food-receiving cylinder that is provided with a number of spaced-apart, elongated, arcuate foraminous sections forming the sides thereof, each of which in turn has a gate swingable thereon and within the cylinder for movement to and from a closed position where the same is releasably locked in place, thereby presenting a plurality of food-receiving baskets.

Other objects of the present invention include the way in which the aforesaid foraminous food-receiving cylinder is mounted for rotation within a hollow oven; the way in which the drum is disposed above a plurality of baffle plates overlying a combustion chamber, thereby cooking the food within the drum by the heat of smoke alone; and the manner of providing damper construction, drainage means and a warming compartment all conveniently associated with the drum of the apparatus to present satisfactory food preparing equipment.

In the drawing:

Figure 1 is a front elevational view of a barbecue oven having a rotatable basket made pursuant to the present invention, parts being broken away and in section to reveal details of construction.

Fig. 2 is a vertical sectional view taken on line II—II of Fig. 1, looking in the direction of the arrows; and Fig. 3 is an enlarged, fragmentary, cross-sectional view taken through the rotatable basket of the barebecue oven.

An elongated, hollow body forms a part of the barbecue apparatus hereof and is broadly designated by the numeral 10. Body 10 is of double-wall construction throughout presenting a pair of sides 12 and 14 joined by ends 16 and 18, an arcuate top 20 and a bottom 22. All of the aforesaid walls forming the body 10 are provided with suitable insulation 24, as clearly indicated in Figs. 1 and 2.

A baffle plate 26 within the body 10 spans the distance between the side walls 12 and 14 directly above a hingedly mounted door 28 in end wall 18, presenting a combustion chamber 30 in body 10. The baffle plate 26 extends from the wall 18 to which it is joined toward the wall 16 and terminates in spaced relationship to the latter, as shown by Fig. 2.

A drain pipe 32 communicates at one end thereof with the baffle plate 26 adjacent the wall 18 and extends through the compartment 30 and through wall 16 to a suitable point of discharge. Each of the side walls 12 and 14 is provided with an elongated guide 34 disposed above the baffle plate 26 and extending to the innermost face of wall 16 for slidably receiving a damper plate 36 that spans the distance between the guides 24.

Plate 36 is movable to and from a position completely closing the space between the inner face of end wall 16 and the proximal end of baffle plate 26 through the medium of a plunger rod 38 joined directly thereto and extending through the wall 16 as shown in Fig. 2.

A second baffle plate 40 superimposed in spaced relationship to baffle plate 26, also spans the distance between the side walls 12 and 14 and extends from the inner face of wall 16 toward the wall 18. The free end of the baffle plate 40 is spaced from wall 18 and both plates 26 and 40 are inclined slightly toward the drain 32.

A portion of the side wall 12 and a corresponding portion of the top wall 20 of the hollow body 10, take the form of a lid or door 42 that is arcuate in cross section as shown in Fig. 1 and extends the full length of the wall 12. One edge of the door 42 is hingedly mounted at 44 and a hand knob or the like 46, adjacent the opposite edge thereof facilitates movement of the door 42 to and from a closed position along a path of travel as indicated by the arrow 48 in Fig. 1.

A smoke outlet or flue 50 having a manually operable damper 52 of the usual character communicates with the body 10 through the top wall 20 adjacent end wall 16.

A warming oven broadly designated by the numeral 54 is mounted directly upon one side of the body 10 in any suitable manner. In the instance illustrated, the bottom wall of the warming oven 54 constitutes a continuation of the bottom 22 of the body 10 having insulated side and end walls, together with a door 56 that preferably extends the full length of the proximal wall 12 of body 10. Door 56 is hingedly joined to the outer face of wall 12 as at 58 for movement in the direction indicated by arrow 60 in Fig. 1. One or more foraminous baskets 62 are adapted to be removably housed directly within the warming oven 54.

It is to be noted in Fig. 1 that the wall 12 is devoid of insulation below the baffle 26 to thereby permit substantial free heat conduction from chamber 30 to oven 54. Part of the body 10 above the baffle 40, is adapted to receive a cylindrical rotatable drum or reel that is hollow throughout and broadly designated by the numeral 64.

The drum 64 includes an elongated shaft 66 spanning the distance between and rotatably mounted within the end walls 16 and 18 of the body 10. One end of the shaft 66 extends beyond the outer face of wall 16 and receives thereon a sprocket 68 having an endless chain 70 trained thereover.

An electric motor or other prime mover 72, having a speed-reducer combined therewith, is conveniently mounted on the outer face of wall 16 through the medium of a bracket 74 and is operably connected with the shaft 66 through chain 70 by means of a sprocket 76.

The shaft 66 is concentrically mounted directly to a pair of circular end plates or discs 78 that are in turn joined by a number of spaced-apart, elongated, foraminous strips 80. The strips 80 are arcuate in cross-section and are spaced-apart, thereby presenting the outermost side wall of the drum 64. The arcuate strips 80 cooperate in presenting a plurality of baskets 82 that are closed in use, through the medium of an elongated flat, foraminous gate 84. In other words, each arcuate strip 80 respectively is provided with a gate 84 confined within the drum 64 and hingedly secured along one longitudinal edge thereof to the corresponding longitudinal edge of the arcuate strip 80 as at 86. The gates 84 are thus swingable upon the hinge 86 that is substantially parallel to the shaft 66 and disposed adjacent the peripheries of disc 78. The swinging movement of the gates 84 is illustrated in Fig. 1 of the drawing and when the same are in a closed operative position spanning the distance between the longitudinal edges of the arcuate sections 80, a closed space 82 adapted to present food-receiving compartments is presented. Any suitable releasable locking means 88 may be provided for joining the longitudinal edges of the sections 80 and their gates 84 opposite to the hinge 86.

The shaft 66 is provided with a plurality of radial vanes 90, there being a vane 90 for each gate 84 respectively and within the swinging path of travel thereof for presenting a stop therefor in the manner shown in Fig. 1, when the gates 84 are in the open condition. It is contemplated further that when the gates 84 are in the open condition resting upon the corresponding vane 90, the space 82 thereof may be closed through the medium of an auxiliary spanning member (not shown) having means for locking the same at 88 and to the longitudinal edge of gate 84 opposite to hinge 86. Through use of such auxiliary gate or foraminous panel, there would be presented a space or basket 82 of an appreciably greater volume having a substantial triangular cross-section and extending the full length of the drum 64 between the plates 78 thereof.

When the barbecue apparatus is placed in use, wood or other fuel is placed in the compartment 30 and kindled to produce a smoke that follows a circuitous path around the baffles 26 and 40 through the foraminous drum 64 and thence out of flue 50. The door 28 of end wall 18 facilitates the kindling of such fire and the dampers 36 and 52 provide the desired regulation. The food to be barbecued and cooked is placed within the drum 64 by opening of the door 42 and placing such raw food upon the innermost face of a proximal gate 84 as the same rests upon its vane 90 as shown in full lines in Fig. 1. While the door 42 is open and after the food is placed upon the gate 84, the same is swung to the dotted line position illustrated in Fig. 1 and locked in place with the corresponding arcuate strip 80 as at 88.

All of the baskets 82 may be filled for rotation simultaneously through the medium of door 42, whereupon the latter is closed and the drum 64 caused to rotate relatively slow by means of prime mover 72. Grease and other moisture that tends to drain from the baskets 82 is free to fall downwardly upon the baffles 40 and 26 where the same will be removed from the body 10 by means of drain 32.

After the barbecuing is complete and prior to eating of the cooked food, the same may be placed within the foraminous basket 62 and placed in the oven 54 for maintaining the same in a warm condition. Any additional drainage will find its way from the oven 54 by means of an outlet 92 that may, if desired, be connected directly with the drain 32.

It is appreciated from the foregoing that a relatively inexpensive barbecuing assembly has been presented that is easy to use and highly efficient in presenting to the food products a substantial volume of smoke for heating and barbecuing the same. Also, a relatively small over-all assembly can be presented while maintaining an adequate capacity within the drum 64. The novel construction of the latter and of the remaining component parts of the apparatus is obviously subject to many changes and modifications and it is manifestly desired to be limited only by the spirit of the invention as defined by the scope of the appended claims.

Having thus described the invention, what is claimed as new and desired to be secured by Letters Patent is:

1. In barbecue apparatus, a cylindrical, rotatable drum having a number of elongated, transversely arcuate, foraminous sections spaced about the circumference thereof and forming a side wall, each section having spaced longitudinal edges; and a flat, foraminous gate within the drum for each section respectively and joined to the longitudinal edges of the latter.

2. In barbecue apparatus, a cylindrical, rotatable drum having a number of elongated, transversely arcuate, foraminous sections spaced about the circumference thereof and forming a side wall, each section having spaced longitudinal edges; and a flat, foraminous gate within the drum for each section respectively and joined to the longitudinal edges of the latter, the gates and the sections being coextensive in length.

3. In barbecue apparatus, a cylindrical, rotatable drum having a number of elongated, transversely arcuate, foraminous sections spaced about the circumference thereof and forming a side wall, each section having spaced longitudinal edges; a flat, foraminous gate within the drum for each section respectively and joined to the longitudinal edges of the latter; and a hinge for each gate respectively and forming the means of joinder thereof with one of said edges of the corresponding section.

4. In barbecue apparatus, a cylindrical, rotatable drum having a number of elongated, transversely arcuate, foraminous sections spaced about the circumference thereof and forming a side wall, each section having spaced longitudinal edges; a flat, foraminous gate within the drum for each section respectively and joined to the longitudinal edges of the latter; a hinge for each gate respectively and forming the means of joinder thereof with one of said edges of the corresponding section; and releasable means for each gate respectively and forming the means of joinder thereof with the other of said edges of the corresponding section.

5. In barbecue apparatus, a cylindrical, rotatable drum having a number of elongated, transversely arcuate, foraminous sections spaced about the circumference thereof and forming a side wall, each section having spaced longitudinal edges; a flat, foraminous gate within the drum for each section respectively and joined to the longitudinal edges of the latter; a hinge for each gate respectively and forming the means of joinder thereof with one of said edges of the corresponding section; releasable means for each gate respectively and forming the means of joinder thereof with the other of said edges of the corresponding section; and means adjacent the axis of the drum for supporting the gates as the same are swung on the hinges thereof to an open position spaced from the side wall of the drum.

DIXON A. HARRISON.

REFERENCES CITED

The following references are of record in the file of this patent:

UNITED STATES PATENTS

| Number | Name | Date |
|---|---|---|
| 1,010,637 | Kircheis | Dec. 5, 1911 |
| 1,312,833 | Colias | Aug. 12, 1919 |
| 1,460,248 | Kott | June 26, 1923 |
| 2,264,846 | Huebsch | Dec. 2, 1941 |
| 2,400,640 | Hanson et al. | May 21, 1946 |